Patented Apr. 26, 1949

2,468,232

UNITED STATES PATENT OFFICE 2,468,232

PROCESS OF PREPARING CASTING SOLUTIONS OF ETHYL CELLULOSE

John H. Prichard, Springfield, N. J., assignor to Celanese Corporation of America, a corporation of Delaware No Drawing. Original application June 28, 1945, Serial No. 602,165. Divided and this application August 13, 1948, Serial No. 44,217

5 Claims. (Cl. 106—184)

This invention relates to cellulose ether compositions and relates more particularly to the preparation of cellulose ether compositions suitable for use in casting operations whereby valuable films and foils having a basis of a cellulose ether of medium ethoxyl value may be obtained.

This application is a division of my application S. No. 602,165, filed June 28, 1945.

The object of this invention is to provide an improved process for the preparation of casting solutions of a cellulose ether of medium ethoxyl value.

The preparation of films and foils by processes involving the casting of solutions of ethyl cellulose or other cellulose ethers in a volatile solvent medium is well known. The cellulose ether most commonly employed commercially is ethyl cellulose which forms tough and highly flexible films and foils of excellent stability to light, heat, water and various chemical agents. The ethyl celluloses employed commercially are available in varying degrees of substitution or ethoxyl value, those of a low degree of substitution having a 43.5 to 44.5% ethoxyl value, the medium range having a 44.5 to 46.8% ethoxyl value and the higher degrees of substitution ranging upward in ethoxyl value from 46.8 to 50%. Of the ethyl celluloses available, ethyl cellulose of an ethoxyl value of 46.8 to 50% is the most soluble in the usual organic solvents. Ethyl celluloses in the next lower range of substitution, e. g. ethers of 44.5 to 46.8% ethoxyl value, are quite hard and tough and possess a combination of desirable properties which make them eminently valuable for use as film or foil bases. Ethyl celluloses of the latter ethoxyl range are soluble in but relatively few single solvents and, accordingly, combinations of solvents must be employed. The binary solvent mixture comprising toluene and ethyl alcohol is quite satisfactory for the formation of casting solutions having a basis of such ethyl cellulose. However, toluene vapors are toxic and attempts have been made to prepare ethyl cellulose solutions for casting operations employing solvent combinations which do not have the disadvantage of containing toxic components yet which yield films of satisfactory properties. Non-toxic solvent mixtures comprising low molecular weight aliphatic ketones and alcohols are often employed in forming cellulose ether casting solutions. While such mixtures are good solvents for ethyl cellulose of higher ethoxyl value, e. g. 46.8 to 49 or 50%, at room temperatures, they are not good solvents for ethyl cellulose of 44.5 to 46.8% ethoxyl value. Even at temperatures of 30 to 50° C., which temperatures are those usually employed during preparation and casting of the ethyl cellulose solutions, they produce only swollen or gel solutions of ethyl cellulose. Consequently, films or foils have not been prepared satisfactorily when employing said solvent mixtures.

I have now found that solvent mixtures comprising a low molecular weight aliphatic ketone, a low molecular weight aliphatic alcohol having at most 3 carbon atoms and an acetic acid ester of a higher molecular weight alcohol, namely one containing at least 4 carbon atoms may be satisfactorily employed for the preparation of films and foils having a basis of a cellulose ether and especially ethyl cellulose of an ethoxyl value of 44.5 to 46.8% by solvent casting operations. In accordance with the novel process of my invention, these cellulose ethers, which are normally incompletely soluble in said solvents, are added to a solvent mixture comprising a low molecular weight aliphatic ketone, alcohol and acetic acid ester, and heating, with stirring, the swollen, gel solution under reflux to a temperature of at least 65° C., and preferably 65 to 80° C. With temperatures up to about 60° C., the heating appears to have substantially no effect upon the solubility characteristics of the ethyl cellulose in the ketone-alcohol-ester solvent mixture employed. However, when heating is continued to a temperature of at least 65° C. a sudden and unexpected change in solubility takes place. The gelled ethyl cellulose dissolves completely to give a clear, smooth solution. On cooling to a temperature 5 to 15° C. or even 25° C. below the boiling point of the most volatile solvent component and settling, or just settling without cooling, so as to eliminate bubbles, the solution obtained is clear and free of gels and the resulting clear solution may then be employed for casting operations as well known in the art. Care must be taken not to allow the solution to cool excessively so as to cause gelation, which would necessitate reheating of the solution. The surface upon which the films or foils are cast may be warm, e. g. at a temperature of about 50° C., or it may be cooler, e. g. at a temperature of 25 to 30° C. When the clear, smooth, heated solution strikes the relatively cool casting surface, a gelation reaction sets in together with the usual solvent evaporation. Films and foils of excellent physical characteristics may be obtained employing the casting solutions prepared by my novel process.

The fact that the combined effect of both gelation and evaporation of the heated solution is capable of yielding such excellent films and foils could not be foreseen from any previous knowledge of the film or foil casting art. This is especially so in view of the fact that clear solutions suitable for casting may be obtained by heating above 65° C. then cooling to, say, 50° C. while merely heating to, say, 50° C. does not produce a satisfactory smooth solution capable of being cast. In fact, where the solutions prepared in the latter manner by limited heating are cast, the films or foils so produced are quite unsatisfactory.

The solvent mixtures employed in practicing the novel process of my invention may comprise aliphatic ketones of low molecular weight, such as for example, acetone or ethyl methyl ketone; lower aliphatic alcohol, such as methyl ethyl propyl and isopropyl alcohol; and acetic acid esters of alcohols of higher molecular weight, such as butyl alcohol, isobutyl alcohol, secondary butyl alcohol, amyl alcohol, isoamyl alcohol and secondary amyl alcohol.

When forming the ternary solvent mixtures employing acetone as the low molecular weight ketone, the acetone may comprise from 25 to 45% by weight of the solvent mixture, the lower aliphatic alcohol 45 to 65% by weight thereof and the acetic acid ester of the aliphatic alcohol of at least 4 carbon atoms about 10% by weight thereof.

Where ethyl methyl ketone is employed as a component, the solvent mixture may contain 45 to 60% by weight of said ketone, 30 to 45% by weight of the low molecular weight alcohol and about 10% by weight of the acetic acid ester of higher molecular weight aliphatic alcohol. The solution may contain from 20 to 25% by weight of the ethyl cellulose of 44.5 to 46.8% ethoxyl value, the remainder being the solvent mixture.

In some instances it may be advantageous to incorporate certain plasticizers in the casting solutions so as to impart to the ethyl cellulose films and foils greater flexibility or other desirable properties. Suitable plasticizers are, for example, tricresyl phosphate, dibutyl phthalate, butyl stearate, castor oil or mineral oil and said plasticizers may be present in amounts of from 2 to 25% or more on the weight of the ethyl cellulose in the composition. Suitable resins, waxes, coloring matter and stabilizing agents may also be added, if desired.

In order further to illustrate my invention, but without being limited thereto, the following examples are given:

Example I 25 parts by weight of ethyl cellulose of about 45% ethoxyl value are tumbled at 25° C. with 150 parts by weight of a solvent mixture comprising 60% by weight of ethyl methyl ketone, 30% by weight of denatured ethyl alcohol (2B formula) and 10% by weight of butyl acetate. The gelatinous solution obtained is heated to 60° C. with no effect on the clarity of the solution. At 75° C. the solution undergoes a sharp change and a clear solution is obtained. After settling to eliminate bubbles, the solution is cast at 75° C. into films employing a casting surface at a temperature of 25° C. Excellent films of commercially acceptable strength and clarity are obtained.

Example II 25 parts by weight of ethyl cellulose of 46.1% ethoxyl value are tumbled at 25° C. with 150 parts by weight of a solvent mixture comprising 45% by weight of acetone, 45% by weight of denatured ethyl alcohol (2B formula) and 10% by weight of butyl acetate. No solution takes place at room temperature. The temperature is gradually raised to over 60° C. without any change in solubility being observed. When the temperature reaches 70° C. a sudden change in solubility takes place and a clear solution is obtained. The solution after settling is cast into films while at a temperature of 67° C. The films produced are of excellent strength and clarity.

It is to be understood that the foregoing detailed description is given merely by way of illustration and that many variations may be made therein without departing from the spirit of my invention.

Having described my invention what I desire to secure by Letters Patent is:

1. In a process for the preparation of casting solutions comprising ethyl cellulose dissolved in a volatile solvent medium, the step which comprises adding to a solvent mixture comprising 25 to 60% by weight of a low molecular weight aliphatic ketone, 30 to 65% of an aliphatic alcohol having at most three carbon atoms and about 10% by weight of an acetic acid ester of an alcohol selected from the group consisting of butyl and amyl alcohols, ethyl cellulose of 44.5 to 46.8% ethoxyl value incompletely soluble in said solvent mixture at temperatures up to about 60° C., and raising the temperature of the solvent mixture to 65° to 80° C. whereby said ethyl cellulose is caused to go into solution.

2. In a process for the preparation of casting solutions comprising ethyl cellulose dissolved in a volatile solvent medium, the step which comprises adding to a solvent mixture comprising 25 to 45% by weight of acetone, 45 to 65% by weight of an aliphatic alcohol having at most three carbon atoms and about 10% by weight of an acetic acid ester of an alcohol selected from the group consisting of butyl and amyl alcohols, ethyl cellulose of 44.5 to 46.8% ethoxyl value incompletely soluble in said solvent mixture at temperatures up to about 60° C. and raising the temperature of the solvent mixture to 65° C. to 80° C. whereby said ethyl cellulose is caused to go into solution.

3. In a process for the preparation of casting solutions comprising ethyl cellulose dissolved in a volatile solvent medium, the step which comprises adding to a solvent mixture comprising 45 to 60% by weight of ethyl methyl ketone, 30 to 45% by weight of an aliphatic alcohol having at most three carbon atoms and about 10% by weight of an acetic acid ester of an alcohol selected from the group consisting of butyl and amyl alcohols, ethyl cellulose of 44.5 to 46.8% ethoxyl value incompletely soluble in said solvent mixture at temperatures up to about 60° C., and raising the temperature of the solvent mixture to 65° to 80° C. whereby said ethyl cellulose is caused to go into solution.

4. In a process for the preparation of casting solutions comprising ethyl cellulose dissolved in a volatile solvent medium, the step which comprises adding to a solvent mixture comprising 45% by weight of acetone, 45% by weight of ethyl alcohol and 10% by weight of butyl acetate, ethyl cellulose of about 46% ethoxyl value incompletely soluble in said solvent mixture at temperatures up to about 60° C., raising the temperature to 70° C. whereby said ethyl cellulose is caused to go into solution.

5. In a process for the preparation of casting solutions comprising ethyl cellulose dissolved in a volatile solvent medium, the step which comprises adding to a solvent mixture comprising 60% by weight of ethyl methyl ketone, 30% by weight of ethyl alcohol and 10% by weight of butyl acetate, ethyl cellulose of about 46% ethoxyl value incompletely soluble in said solvent mixture at temperatures up to about 60° C., raising the temperature to 75° C. whereby said ethyl cellulose is caused to go into solution.

JOHN H. PRICHARD.

No references cited.